United States Patent [19]
Yamamori et al.

[11] Patent Number: 5,642,206
[45] Date of Patent: Jun. 24, 1997

[54] IMAGE INPUT EQUIPMENT FOR TRANSMITTING VIDEO SIGNALS OF AN IMAGE OF AN OBJECT TO A MONITOR TELEVISION

[75] Inventors: Motohiko Yamamori, Kasugai; Kazuhiro Sukenari, Nagoya, both of Japan

[73] Assignee: Elmo Co., Ltd., Aichi, Japan

[21] Appl. No.: 297,592

[22] Filed: Aug. 29, 1994

[30] Foreign Application Priority Data

Aug. 31, 1993 [JP] Japan ................................ 5-240388

[51] Int. Cl.[6] .................................................. H04N 1/04
[52] U.S. Cl. ........................ 358/471; 358/479; 348/370
[58] Field of Search .............................. 358/471, 474, 358/475, 479, 494, 400; 355/232–235, 44, 45; 348/370, 373–376; H04N 1/04

[56] References Cited

U.S. PATENT DOCUMENTS

| | | | |
|---|---|---|---|
| 4,831,455 | 5/1989 | Ishikawa et al. | 358/471 |
| 4,916,550 | 4/1990 | Miyake et al. | 358/471 |
| 5,028,680 | 7/1991 | Sugimoto et al. | 358/400 |
| 5,247,330 | 9/1993 | Ohyama et al. | 348/375 |
| 5,339,173 | 8/1994 | Jinnai | 358/471 |
| 5,444,486 | 8/1995 | Mizuno et al. | 348/370 |

*Primary Examiner*—Kim Vu
*Attorney, Agent, or Firm*—Koda and Androlia

[57] ABSTRACT

An image input equipment comprises an image input head having an image pickup element and an image input lens built therein, a stage on which an object is to be placed, a supporting pillar for supporting the image input head and positioning the image input head over the stage, said image pickup element for photoelectrically converting an image of the object to an electric signals, said image input lens for forming the image of the object on the image pickup element. The image input head is assembled pivotally on the supporting pillar to pick up the image of the object placed in front of and in rear of the stage as well as the image of the object placed on the stage. The image pickup element can be turned through an angle of at least 180° on an optical axis of the image input lens integral with the image input lens. By operating the image input lens, the erect images of the objects placed in front of the stage and in rear of the stage and the object which is to long to be placed on the stage can be displayed on a monitor television.

9 Claims, 8 Drawing Sheets

IMAGE INPUT EQUIPMENT FOR TRANSMITTING VIDEO SIGNALS OF AN IMAGE OF AN OBJECT TO A MONITOR TELEVISION

BACKGROUND OF THE INVENTION

The present invention relates to an image input equipment, and more particularly to the image input equipment for transmitting video signals of an an image of an object provided by an image input head to monitor television or video projector to reproduce the image of the object.

An image input equipment of this type is disclosed by U.S. Pat. No. 4,916,550. The image input equipment of U.S. Pat. No. 4,916,550 includes an image input head having an image pickup element and an image input lens built therein, a stage on which an object is to be placed, and a supporting pillar for supporting the image input head and positioning the image input head over the stage, said image pickup element for photoelectrically converting an image of the object to an video signals, said image input lens for forming the image of the object on the image pickup element, said image input head assembled pivotally on the supporting pillar.

According to such a construction, images of the objects placed in front of and in rear of the stage, as well as an image of the object placed on the stage can be picked up by moving the image input head.

if such an image input equipment is used to explain a material to audience, a user places the material on the stage in such an orientation as to be convenient for explanation, namely in such a manner that the material is erect as viewed by the user and views the material from the front of the stage when explaining the material. According to such an image input equipment, when picking up an image of the material placed on the stage, an erect image of the material is displayed on a monitor television. Thus, when picking up an image of an object placed in front of the stage, an inverted image of the object is displayed on the monitor television.

There is a material which is too long to be placed on the stage in such a manner as to be erect as viewed by a user. If such a long material is displayed on the monitor television, an erect image of the long material cannot be displayed on the monitor television.

In view of the foregoing, it is a primary object of the present invention to provide on image input equipment in which an erect image of an object positioned in front of the stage and an erect image of an object which is too long to be placed on the stage, as well as an erect image of an object placed on the stage can be displayed on a monitor television.

it is another object of the present invention to provide an image input equipment which has a simple construction and is easy to operate.

To attain the above objects, the image input equipment of the present invention is characterized by comprising: an image input head having an image pickup element and an image input lens built therein, said image pickup element for photoelectrically converting an image of an object to an electric signals, said image input lens for forming the image of the object on the image pickup element, a stage on which the object is to be placed, a supporting pillar for supporting the image input head and positioning the image input head over the stage, said image input head assembled pivotally on the supporting pillar in such a manner as to pick up the image of the object placed in front of the stage as well as the image of the object placed on the stage, said image pickup element assembled on the image input head in such a manner as to turn through an angle of at least 180° on an optical axis of the image input lens.

According to the image input equipment, the image input lens is assembled on the the image input head in such a manner as to turn on the optical axis thereof and the image pickup element moves integral with the image input lens.

When the image pickup lens is turned through an angle of 180° on the optical axis thereof, the image input element turns integral with the image input lens. Thus, the image of the object displayed on the monitor television can be reversed. Accordingly, to pick up the image of the object placed in front of the stage, the image pickup element is turned through an angle of 180° on the optical axis from the position in which the image pickup element is positioned to pick up the image of the object placed on the stage. When the image pickup element is moved through an angle of 180°, thereof, the erect image of the object placed in front of the stage can be displayed on the monitor television, Just as the erect image of the object placed on the stage is displayed on the monitor television.

In this way, if the image pickup element is turned, the image of the object displayed on the monitor television can be turned. That is, the object placed on the stage is not needed to be moved. Accordingly, to pick up the image of the object which is too long to be placed on the stage in such a manner as to be erect as viewed by an user, the image pickup element is turned. When the image pickup element is turned, the erect image of the object can be displayed on the monitor television.

The above and further objects and novel features of the invention will more fully appear from the following detailed description when the same is read in connection with the accompanying drawing. It is to be expressly understood, however, that the drawing is for purposed of illustration only and is not intended as a definition of the limits of the invention.

DETAILED DESCRIPTION OF THE PREFERRED EMBODIMENT

Figure 1:
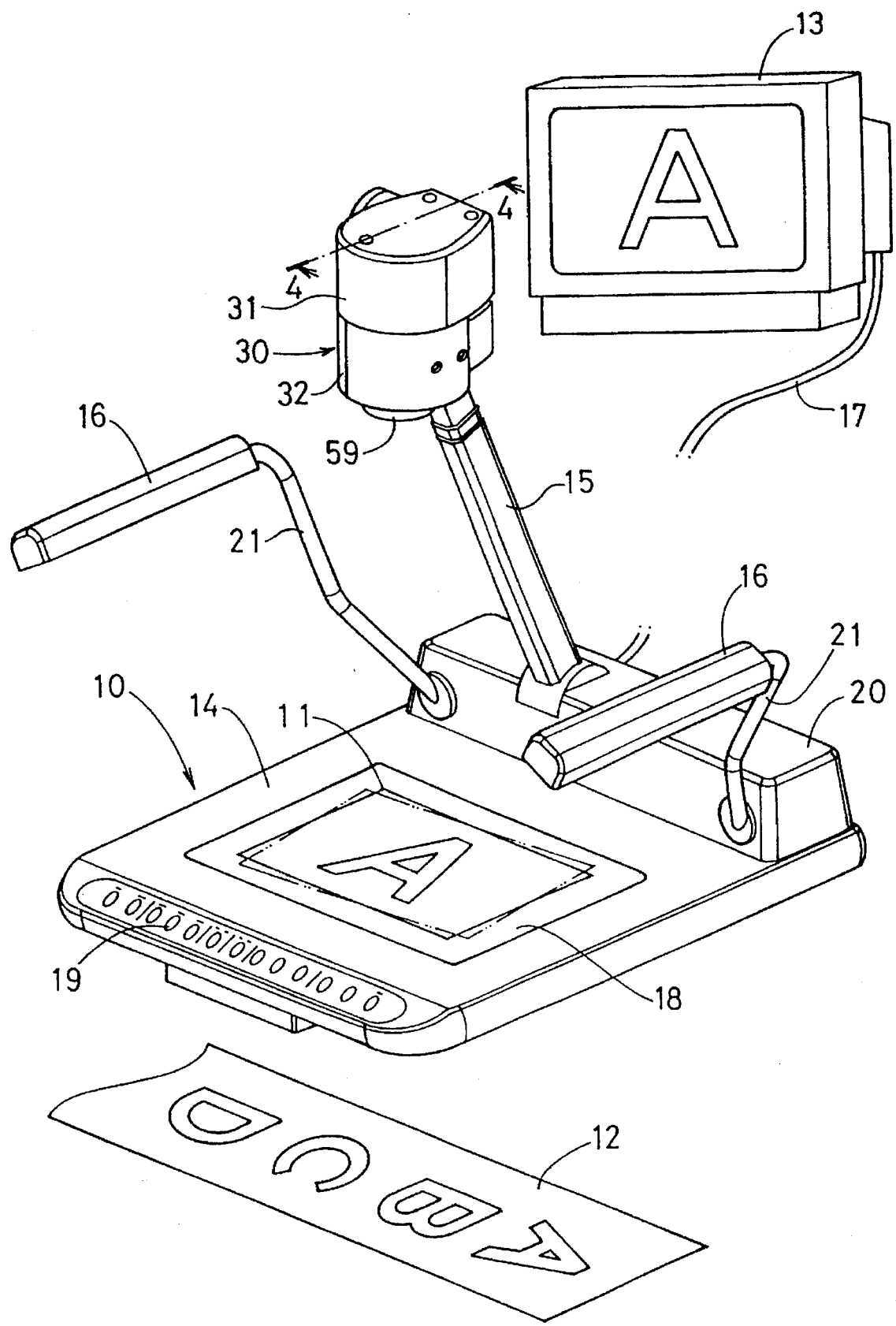
FIG. 1 is perspective view showing an entire image input equipment of a preferred embodiment according to the present invention.

Referring to FIG. 1, there is shown an image input equipment 10 according to a preferred embodiment of the present invention, two kinds of objects 11 and 12 whose images are to be input by the image input equipment 10, and a monitor television 13 displaying the image of the object 11. The image input equipment 10 comprises a stage 14 on which the object 11 is to be placed, an image input head 30 for inputting an image of the object 11, a supporting pillar 15 for supporting the image input head 30 and positioning the image input head 30 over the stage 14, and a pair of exterior illumination lamps 16 for illuminating the object 11. The image input equipment 10 is connected to the monitor television 13 through a cord 17, so that the image of the object 11 can be displayed on the monitor television 13. In a center of the stage 14 a semi-transparent plate 18 is provided. Under the plate 18 interior illumination lamps (not illustrated) are provided. The interior illumination lamps can be used to illuminate the transparent object 11, such as a pictorial film. At a front end of the stage 14 various operating switches 19 are disposed.

Figure 3:
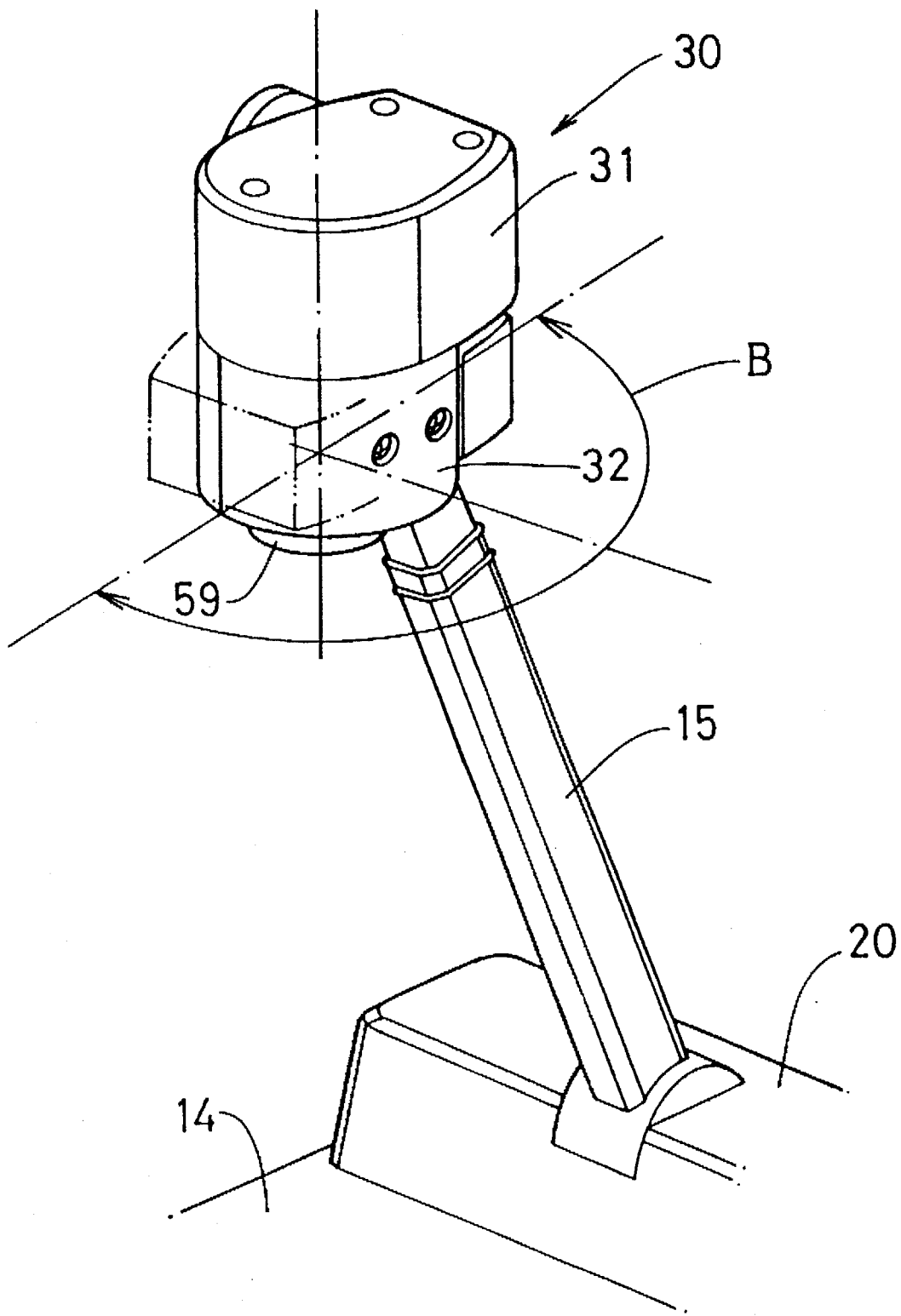
FIG. 3 is a perspective view to help explain the movement of the image input head of the image input equipment.

At a rear end of the stage 14 a base 20 is provided. In the base 20 there is provided known circuitry for controlling actuation of the image input equipment 10, such as a power circuit for converting a commercial alternating-current power into a direct current power of a required voltage, a high-frequency circuit for turning on the illumination lamps, and a signal process circuit for converting signals yielded from an image pickup element (described later) into video signals. On the both ends of the base 20, arms 21 are mounted, said arms 21 for supporting the exterior illumination lamps 16. In a middle of the base 20 the supporting pillar 15 is pivotally mounted on the base 20. The supporting pillar 15 can be locked in a raising-up position as illustrated in FIG. 1 and a folding-down position in which the supporting pillar 15 is folded down to the stage 14 by a lock mechanism. The image input head 30 has a head housing 31 and a lens housing 32. The lens housing 32 is pivotally mounted on an end of the supporting pillar 15 via a mechanism 40 for moving the image input head 30 (described later). The lens housing 32 is assembled on the head housing 31 via a mechanism 60 for moving an image input lens 59 (described later) in such a manner as to be movable in directions shown in FIG. 3

Figure 4:
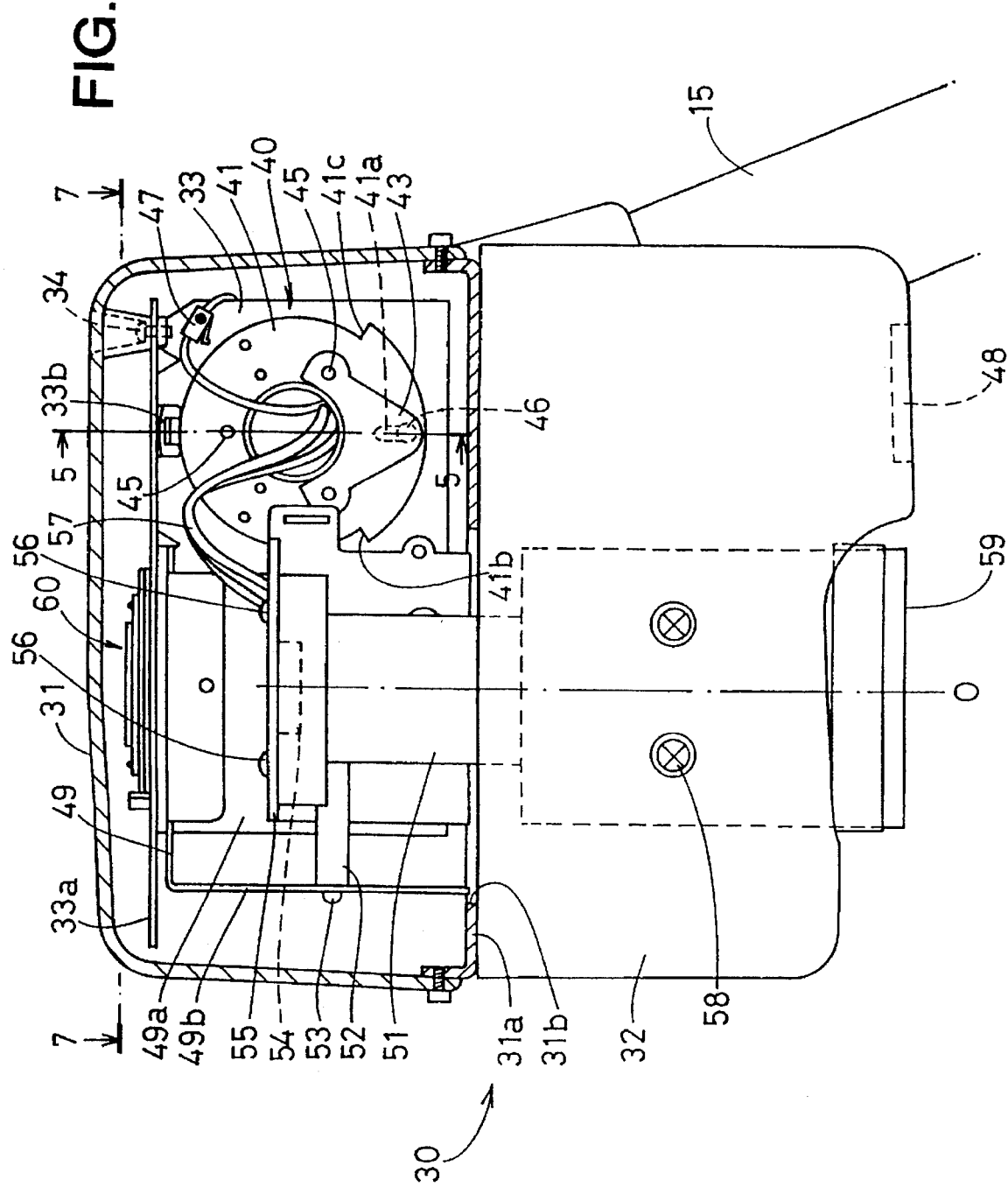
FIG. 4 is a view in side elevation partly broken away to show interior construction of the image input head.
Figure 5:
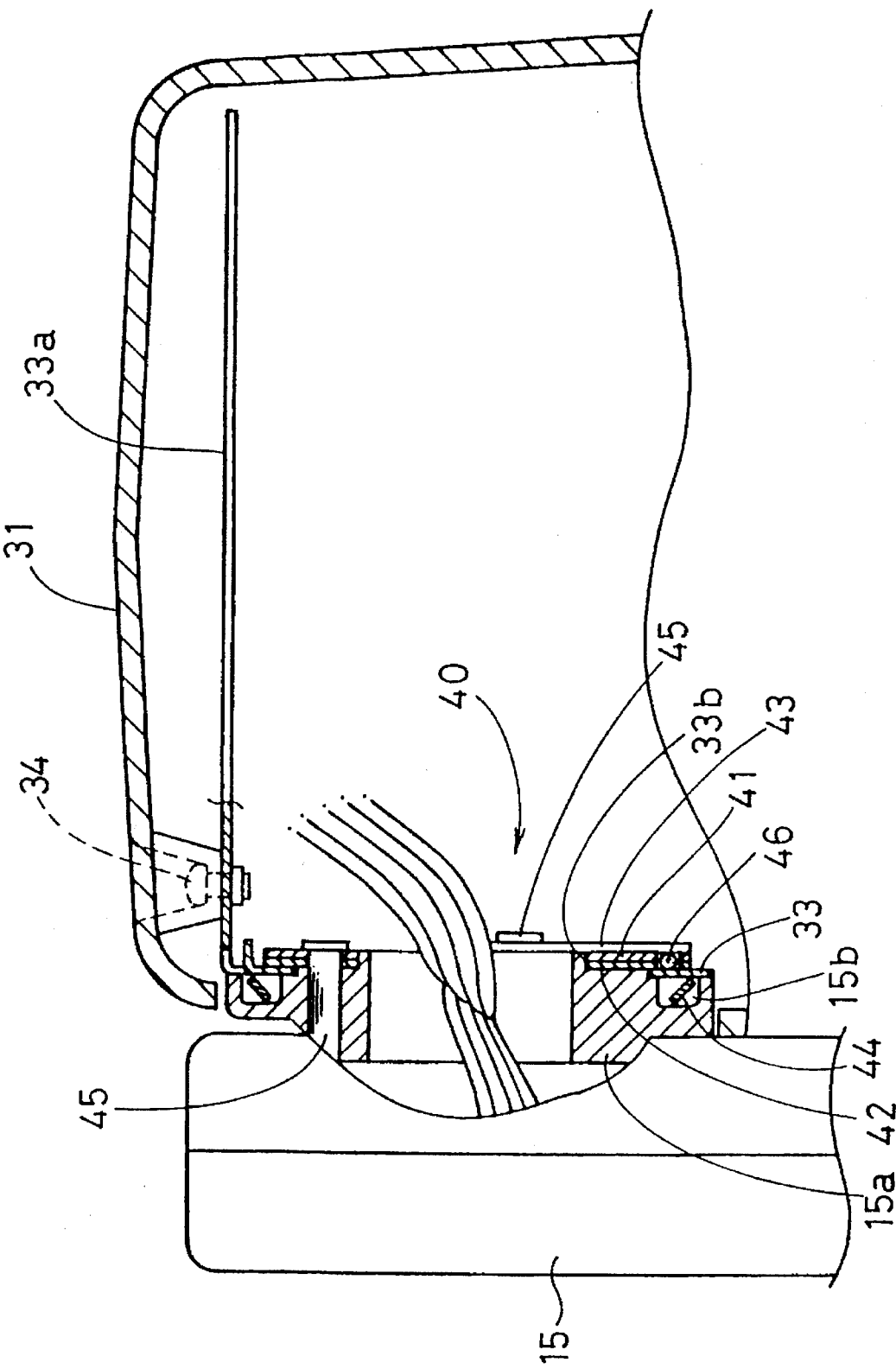
FIG. 5 is a partially enlarged sectional view taken on line 5—5 of FIG. 4.

FIG. 4 to FIG. 7 show interior construction of the image input head 30. The image input head 30 has a head holding frame 33 inside it. The head holding frame 33 has an upper surface 33a, on which the head housing 31 is fixed by three screws 34. As illustrated in FIG. 5, the head holding frame 33 has a hole 33b, while the supporting pillar 15 has a hollow shaft 15a formed on a side of an end thereof, said hollow shaft 15a having an annular groove 15b formed on an outer circumference of an end thereof. The hollow shaft 15a is set in the hole 33b. As illustrated in FIG. 4 and FIG. 5, the mechanism 40 comprises an annular plate 41, a seat plate 42, a leaf spring 43, and a disc spring 44. The annular plate 41 and the seat plate 42 are set in the hollow shaft 15a. The disc spring 44 is inserted in the annular groove 15b. The annular plate 41 and the seat plate 42 are secured to the hollow shaft 15a by bolts 45. The disc spring 44 presses the head holding frame 33 on the seat plate 42. The head holding frame 33 is movably assembled on the hollow shaft 15a by the annular plate 41, the seat plate 42, and the disc spring 44. With such a construction, the image input head 30 is pivotably assembled on the end of the supporting pillar 15. The disc spring 44 exerts a friction on the head holding frame 33 and the seat plate 42, so that the image input head 30 can be held in given positions.

The annular plate 41 and the seat plate 42 have holes of small diameter, in which holes a steel ball 46 is fitted. The steel ball 46 is pressed on the head holding frame 33 by the leaf spring 43 fixed on the annular plate 41 by the bolts 45. The head holding frame 33 has a concavity 41a as illustrated in FIG. 4. The steel ball 46 is adapted to be fitted in the concavity 41a when the image input head 30 is positioned in such a position that an optical axis O of an image input lens 59 (described later) supported by the standing supporting pillar 15 is perpendicular to the stage 14.

Figure 2:
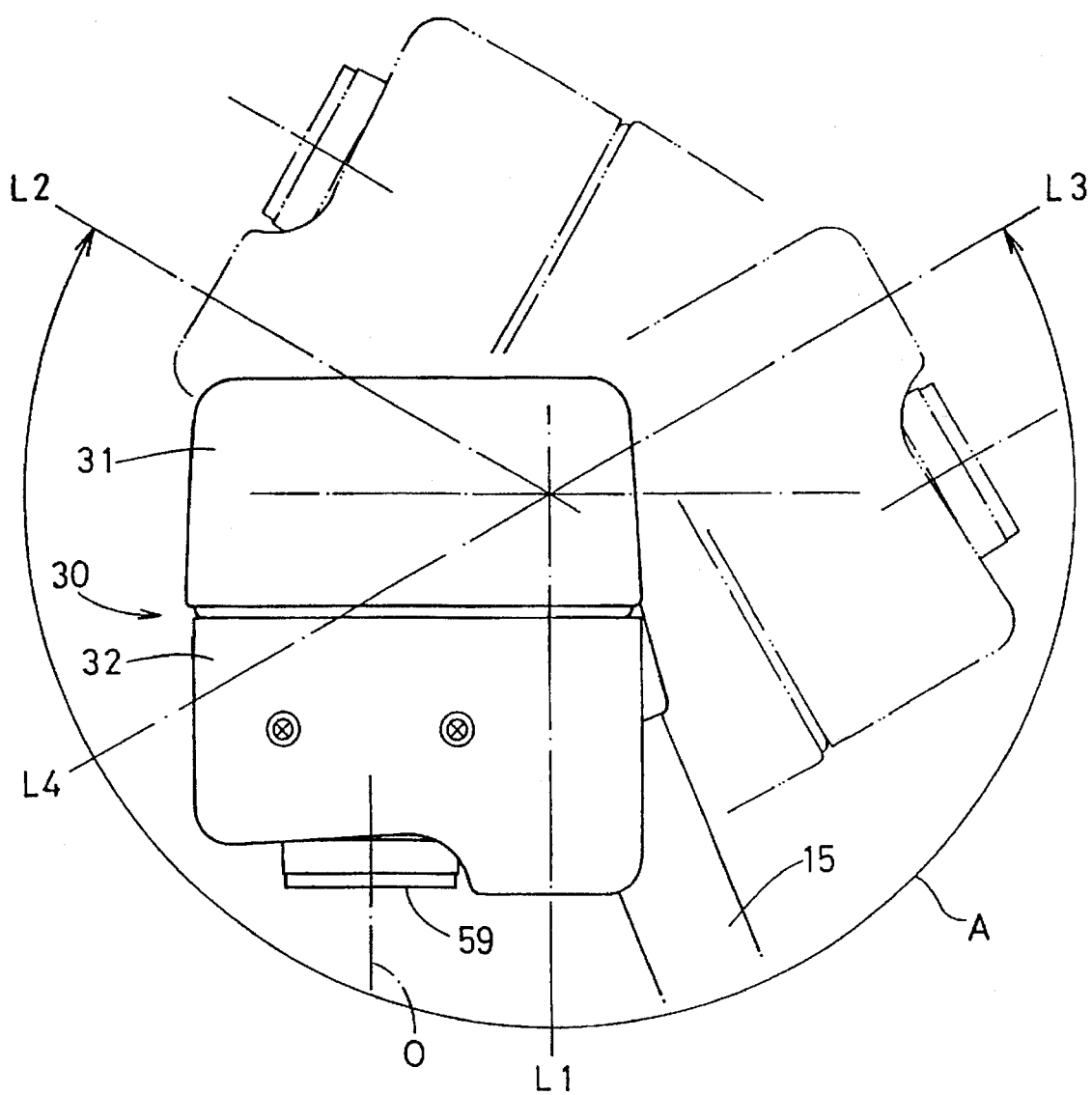
FIG. 2 is a diagrammatic view to help explain the movement of an image input head of the image input equipment.

The annular plate 41 has steps 41b and 41c provided on an outer circumference thereof. The head holding frame 33 has a projection 33b, which is adapted to connect with the steps 41b and 41c. When the image input head 30 is pivoted, moving the head holding frame 33, the projection 33b connects with the steps 41b or 41c to prevent further pivotal movement of the image input head 30. Thus, because the projection 33b connects with the steps 41b or 41c, the image input head 30 can be pivoted only between positions L2 and L3 as illustrated in FIG. 2, the position L2 being located approximately 150° forward from a position L1, the position L3 being located approximately 150° backward from the position L1, the position L1 in which the optical axis of an image input lens 59 is perpendicular to the stage 14.

On the head holding frame 33 a microswitch 47 is fixed, said microswitch 47 for switching on or off a microphone 48 mounted on the lens housing 32. The microswitch 47 is located in a required position relative to the step 41c in such a manner that the step 41c of the annular plate 41 switches on the microswitch 47 when the image input head 30 is directed before the stage 14, namely when the image input head 30 is positioned between the position L4 and the position L2 of FIG. 2.

Figure 6:
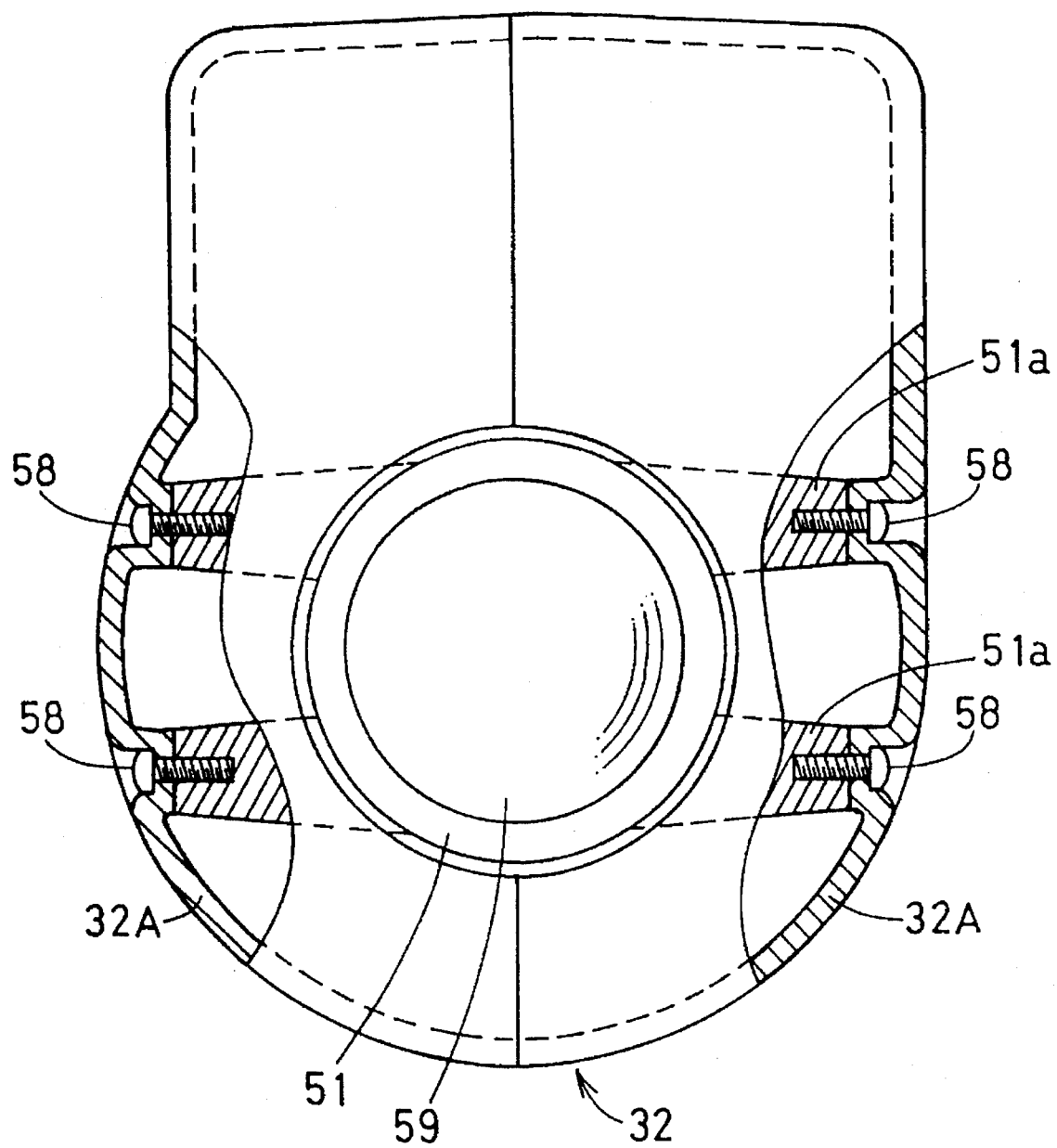
FIG. 6 is a view in bottom partly broken away to show the image input head.

On the upper surface 33a of the head holding frame 33 a lens holding frame 49 is movably assembled by the mechanism 60. The lens holding frame 49 has two sides 49a and 49b, on which a lens barrel 51 of the image input lens 59 is fixed by screws vis 53 through rods 52 moulded integral with the lens barrel 51. On an upper end of the lens barrel 51 a circuit board 55 is fixed by screws 56, said circuit board 55 in which an image pickup element 54 is disposed. As the image pickup element 54, CCD (charge coupled device) is used and is fixed on the lens barrel 51 in such a manner that a center of the image pickup element 54 conforms to the optical axis O of the image input lens 59. The circuit board 55 and the signal process circuit provided in the base 20 are connected by a cable 57, which extends in an interior of the supporting pillar 15. The head housing 31 has an opening 31b formed on a bottom thereof. Through the opening 31b, the lens barrel 51 projects outside the head housing 31. As illustrated in FIG. 6, the lens barrel 51 has four rods 51a. The lens housing 32 consists of casings 32A and 32B. The casings 32A and 32B are fixed on the rods 51a by screws 58, so that the lens housing 32 is formed integral with the lens barrel 51. On a bottom of the lens housing 32 the image input lens 59 appears.

Figure 7:
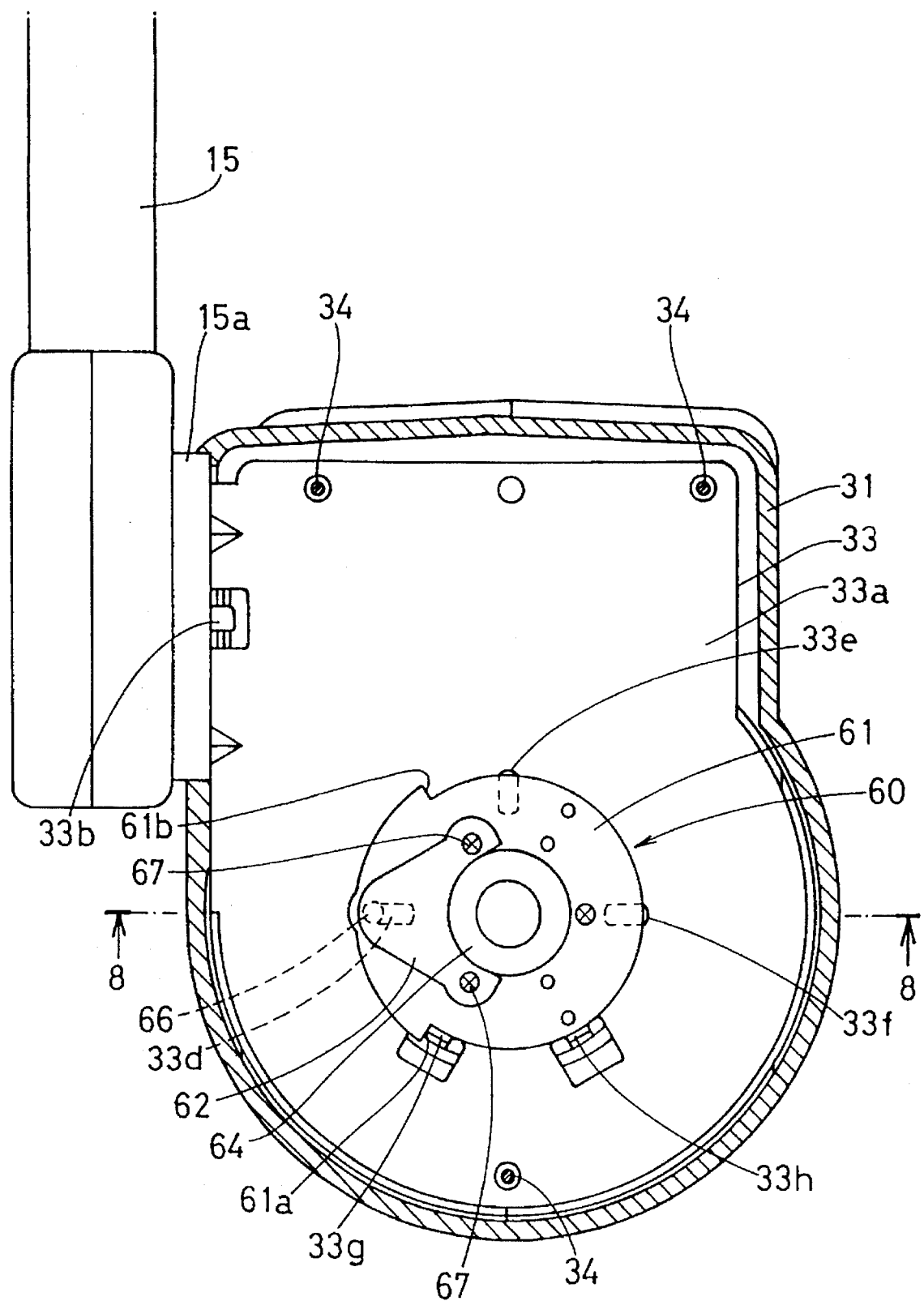
FIG. 7 is a partially enlarged sectional view taken on line 7—7 of FIG. 4.
Figure 8:
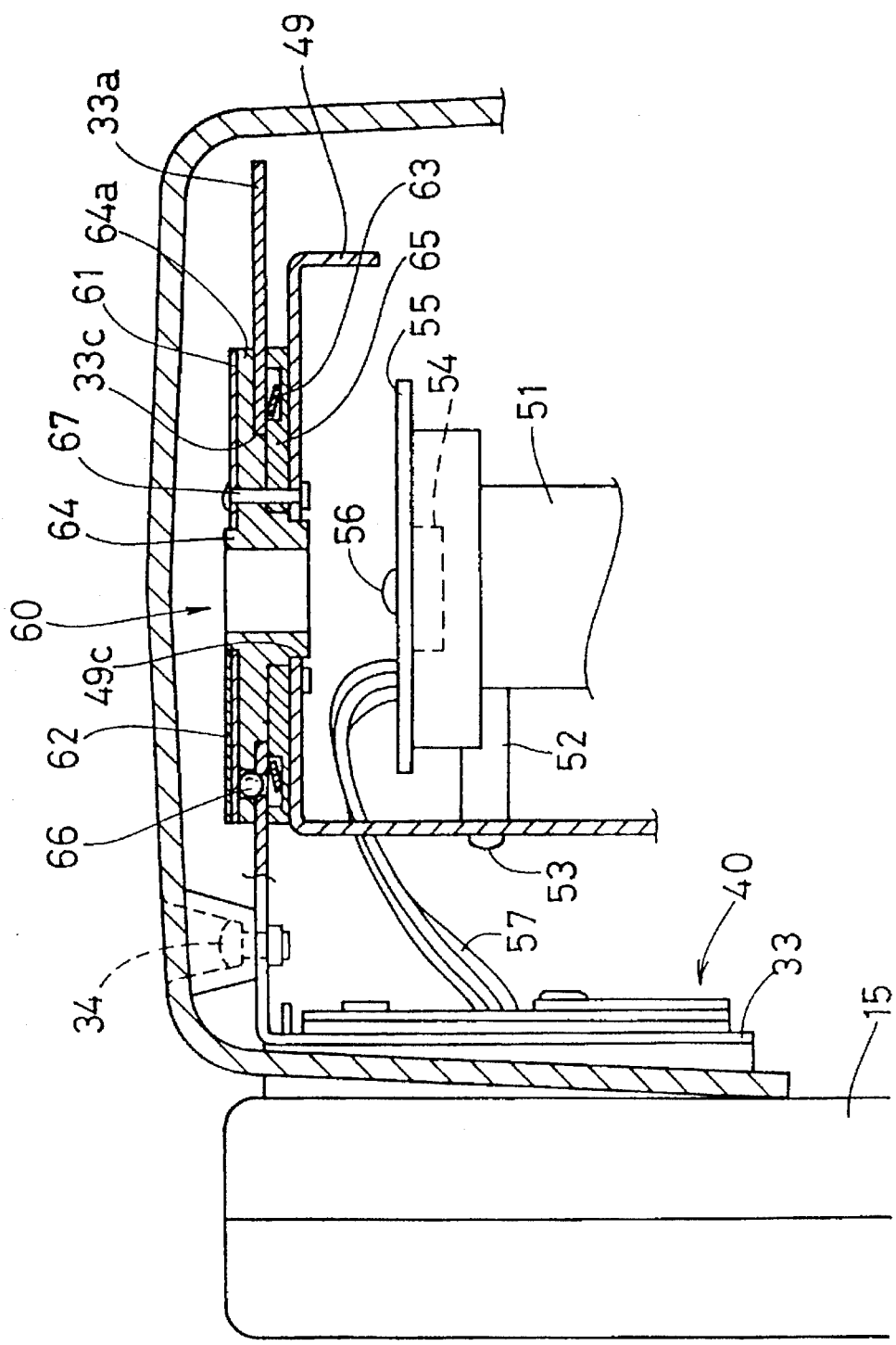
FIG. 8 is a partially enlarged sectional view taken on line 8—8 of FIG. 7.

As illustrated in FIG. 7 and FIG. 8, the mechanism 60 has an annular plate 61, a leaf spring 62, a disc spring 63, a hollow haft 64, and a annular spring shoe 65. The hollow shaft 64 is movably set in a hole 33c formed in the upper surface 33a of the head hold frame 33 and is movably set in a hole 49c formed in the lens holding frame 49. The annular plate 61 is attached to an upper surface of a flange 64a of the hollow shaft 64 and the annular spring shoe 65 is attached to a reverse side of the flange 64a.

The hollow shaft 64, the annular plate 61, and the annular spring shoe 65 are integrally secured to the lens holding frame 49 by screws 66. The annular spring shoe 65 has an annular groove 65a, in which the disc spring 63 is inserted. The disc spring 63 presses the head holding frame 33 on a flange 64a of the hollow shaft 64. By the annular plate 61, the hollow shaft 64, and the annular spring shoe 65, the lens holding frame 49 is assembled movably on the upper surface 33a of the head holding frame 33. The lens barrel 51 of the image input lens 59 is mounted on the lens holding frame 49 in such a manner that the optical axis O of the image input lens 59 conforms to a center of the hollow shaft 64. Thus, the image input lens 59 and the image pickup element 54 are assembled on the head holding frame 33 in such a manner as to be able to turn on the optical axis O and can be held in given positions due to a friction exerted by the upper surface 33a of the head holding frame 33 and the flange 64a of the hollow shaft 64.

The annular plate 61 and the flange 64a of the hollow shaft 64 have holes of small diameters formed therein, in which holes steel ball 66 are set. The steel ball 66 is pressed on the upper surface 33a of the head holding frame 33 by the leaf spring 62 fixed on the annular plate 61 by screws 67.

The head holding frame 33 has three concavities 33d, 33e, and 33f formed on the upper surface 33a thereof. The concavities 33d and 33e, and the concavities 33e and 33f are located in such a manner as to form an angle of 90° on the optical axis O.

The annular plate 61 has steps 61a and 61b formed on an outer circumference thereof. The head holding plate 33 has projections 33g and 33h provided on the upper surface 33a thereof. The projections 33g and 33h are adapted to connect with the steps 61a and 61b.

When the image input lens 59 in turned on the optical axis O, moving the lens holding frame 49, the projections 33g and 33h connect with the steps 61a and 61b, to prevent further turning movement of the image input lens 59. Accordingly, the image input lens 59 can be turned only within an angle of 180°, as shown by an arrow B of FIG. 3.

The image input equipment is constructed as above. To transmit video signals of an image of the object 11 provided by the image input head 30 to the monitor television 13 and to display the image on the monitor television 13, the image input equipment is operated as follows:

The image input head 30 is pivotally moved as shown with arrow A of FIG. 2, so that the steel ball 46 of the mechanism 40 is set in the concavity 41a. When the steel ball 46 is set in the concavity 41a, the image input head 30 is positioned in such a position that the optical axis O of the image input lens 59 is perpendicular to the stage 14. Next, the lens housing 32 is turned along a surface which is parallel to the stage 14, as shown with arrow B of FIG. 3, so that the steel ball 66 is set in the concavity 33d.

When the steel ball 46 is set in the concavity 41a and the steel ball 66 is set in the 33d, the image input head 30 is set up as shown in FIG. 1. In this state the object 11 is placed on the stage 14 in such a manner that the image of the object 11 is erect as viewed from the front of the stage 14.

The image of the object 11 is formed by the image input lens 59 on the image pickup element 54, which photoelectrically converts the image of the object 11 into electric signals. The signal process circuit converts the electric signals to video signals, which are transmitted to the monitor television 13. Thus, the erect image of the object 11 is displayed on the monitor television 13, as illustrated in FIG. 1.

When picking up the object 11 placed slantly on the stage 14 as illustrated by a two-dot line of FIG. 1, the slanted image of the object 11 is displayed on the monitor television 13. In such a case, the lens housing 32 is moved slightly in such a manner that the image input lens 59 is moved on the optical axis O. When the image input lens 59 moves, the image pickup element 54 moves integral with the image input lens 59, so that the slanted image of the object 11 displayed on the monitor television 13 is turned to become an erect image.

To pick up the object placed in front of the stage 14, such as operators face, the image input head 30 is moved and the image input lens 59 is directed to the face. In such a case an inverted image of the face is displayed on the monitor television 13. Thus, with the image input lens 59 directed to the face, the lens housing 32 is moved, so that the steel ball 66 is set in the concavity 33f. When the lens housing 32 moves so that the steel ball 66 is set in the concavity 33f, the image pickup element 54 moves integral with the image input lens 59 through an angle of 180°. When the image pickup element 54 moves integral with the image input lens 59 through an angle of 180°, the inverted image of the face displayed on the monitor television 13 is reversed to become the erect image. When the image input head 30 moves beyond the position L4 shown in FIG. 2, the microswitch 47 is switched on, so that the microphone 48 is turned on. Thus, the microphone 48 can input the operator's voice.

To pick up an image of the object placed in rear of the stage 14, the image input head 30 is directed to the rear of the stage 14 from the position shown in FIG. 1. In such a case an erect image of the object 11 displayed on the monitor television 13. Thus, the lens housing 32 is not needed to be operated.

When picking up an image of the long object 12 placed on the stage 14 with the object 12 protruding from the right and the left end of the stage 14, an image of the object 12 tilting through an angle of 90° is displayed on the monitor television 13. In such a case, the lens housing 32 is moved, so that the steel ball 66 is set in the concavity 33e. When the lens housing 32 is moved so that the steel ball 66 is set in the concavity 33e, the image pickup element 54 moves through an angle of 90°. When the image pickup element 54 moves through an angle of 90°, the slanted image of the object is turned to become an erect image.

As previously discussed, the image pickup element 54 can be moved through an angle of 180° or more on the optical axis O of the image input lens 59. Thus, when the image pickup element 54 is moved through an angle of 180°, the image of the object 11 displayed on the monitor television 13 can be reversed. Accordingly, to pick up an erect image of the object placed in front of the stage 14, the image pickup element 54 is moved through an angle of 180° on the optical axis O from the position in which the image pickup element 54 is positioned to pick up the image of the object 11 placed on the stage 14. As a result thereof, the erect image of the object placed in front of the stage 14 can be displayed on the monitor television 13, Just as the erect image of the object 11 placed on the stage is displayed on the monitor television 13.

In this way, if the image pickup element 54 is moved, the image of the object 11 displayed on the monitor television 13 can be turned. Thus, the object 11 placed on the stage 14 is not needed to be moved. Accordingly, to pick up the erect image of the object 12 which is too long to be placed on the stage 14, the image pickup element 54 is moved. When the image pickup element 54 is moved, the erect image of the long object 12 can be displayed on the monitor television 13.

As described above, the image pickup element 54 is adapted to move integral with the image input lens 59. Thus, if a center on which the image pickup element 54 turns is made to conform to the optical axis O of the image input lens 59 on assembly, the center of the image pickup element 54 does not deviate from the optical axis O, even though the image pickup element 54 is operated. This can maintain a required accuracy. Further, the image input lens 59 can be operated to turn a video image of the object 11 or 12.

Also, when the steel ball 46 is set in the concavity 41a, the image input head 30 can be positioned in such a position that the optical axis O of the image input lens 59 is perpendicular to the stage 14. Thus, the image input head 30 can be easily set up to pick up the object 11 placed on the stage 14.

The projection 33b connects with the steps 41b and 41c, so that the image input head 30 can be turned only through an angle of 360° or less. Thus, the cable 57 can be prevented from being twisted by the turning image input head 30.

The image input head 30 can be positioned in a required position due to a friction exerted by the disc spring 44. Thus, the image input head 30 can be set up easily in a required position.

Thus according to the image input equipment it is easy to pick up not only images of the object 11 placed in front of the stage 14 or the object 11 placed in the back of the stage 14, but also an image of the object 12 which is too long to be placed on the stage 14.

The steel ball 66 is set in the concavity 33d, 33e or 33f, so that turning positions of the image pickup element 54 can be determined. Thus, a video image of the object 11 or 12 displayed on the monitor television 13 can be turned swiftly and exactly.

The projection 33g and 33h connect with the steps 61a and 61b, so that the image pickup element 54 is turned through an angle of 360° or less. Thus, the cable 57 can be prevented from being twisted when the image pickup element 54 is turned.

Further, the image pickup element 54 can be held in a given position due to a friction exerted by the disc spring 63. Thus, the image pickup element 54 can be set up in a desired position. Accordingly, a video image of the object 11 or 12 displayed on the monitor television 13 can be easily turned in a desired orientation.

While the invention has been particularly shown and described with reference to preferred embodiments thereof, it will be understood by those skilled in the art that the foregoing and other changes in form and details can be made therein without departing from the spirit and scope of the invention.

What is claimed is:
1. An image input equipment comprising:
   an image input head having an image pickup element and an image input lens built therein,
   said image pickup element for photoelectrically converting an image of an object to electric signals,
   said image input lens for forming the image of the object on the image pickup element,
   a stage on which the object is to be placed,
   a supporting pillar for supporting the image input head and positioning the image input head over the stage,
   said image input head assembled pivotably on the supporting pillar in such a manner as to pick up the image of the object placed in front of the stage as well as the image of the object placed on the stage,
   said image pickup element assembled on the image input head in such a manner as to turn through an angle of at least 180° on an optical axis of the image input lens.
2. The equipment according to claim 1, wherein the image input lens is assembled on the the image input head in such a manner as to turn on the optical axis thereof and the image pickup element moves integral with the image input lens.
3. The equipment according to claim 1, wherein there is provided means for positioning the image input head in such a position that the optical axis of the image input lens is substantially perpendicular to the stage.
4. The equipment according to claim 1, wherein there is provided means for limiting a turning angle of the image input head to 360° or less.
5. The equipment according to claim 1, wherein there is provided means for holding the image input head in given turning positions due to a friction force.
6. The equipment according to claim 1, wherein there is provided means for positioning the image pickup element in an original position and in a turning position being located through an angle of 180° from the original position.
7. The equipment according to claim 1, wherein there is provided means for positioning the image pickup element in an original position and in an intermediate position being located through an angle of 90° from the original position.
8. The equipment according to claim 1, wherein there is provided means for limiting a turning angle of the image pickup element to 360° or less.
9. The equipment according to claim 1, wherein there is provided the means for holding the image pickup element in given turning positions due to a friction force.

* * * * *